United States Patent [19]

Bishop

[11] 4,000,491
[45] Dec. 28, 1976

[54] SCAN SIMULATOR FOR SECONDARY RADAR/IFF TESTING
[75] Inventor: Walton B. Bishop, Oxon Hill, Md.
[73] Assignee: The United States of America as represented by the Secretary of the Navy, Washington, D.C.
[22] Filed: May 28, 1975
[21] Appl. No.: 581,503
[52] U.S. Cl. .............................................. 343/17.7
[51] Int. Cl.² ........................................... G01S 7/40
[58] Field of Search ................................. 343/17.7

[56] References Cited
UNITED STATES PATENTS

| | | | |
|---|---|---|---|
| 3,357,016 | 12/1967 | Peronneau et al. | 343/17.7 |
| 3,500,405 | 3/1970 | Rosenbaum | 343/17.7 |
| 3,800,440 | 4/1974 | Membrino et al. | 343/17.7 |

Primary Examiner—T.H. Tubbesing
Attorney, Agent, or Firm—R. S. Sciascia; Philip Schneider; Norman Brown

[57] ABSTRACT

A reply simulator for generating binary 1's and 0's representative of "friend" and "non-friend" replies received by an IFF system. Simulated replies are produced in a probabilistic fashion which takes into account variation in a simulated received signal caused by simulated antenna pattern and antenna direction variations, as well as by the probability that a "non-friend" will produce a "friend" reply.

3 Claims, 1 Drawing Figure

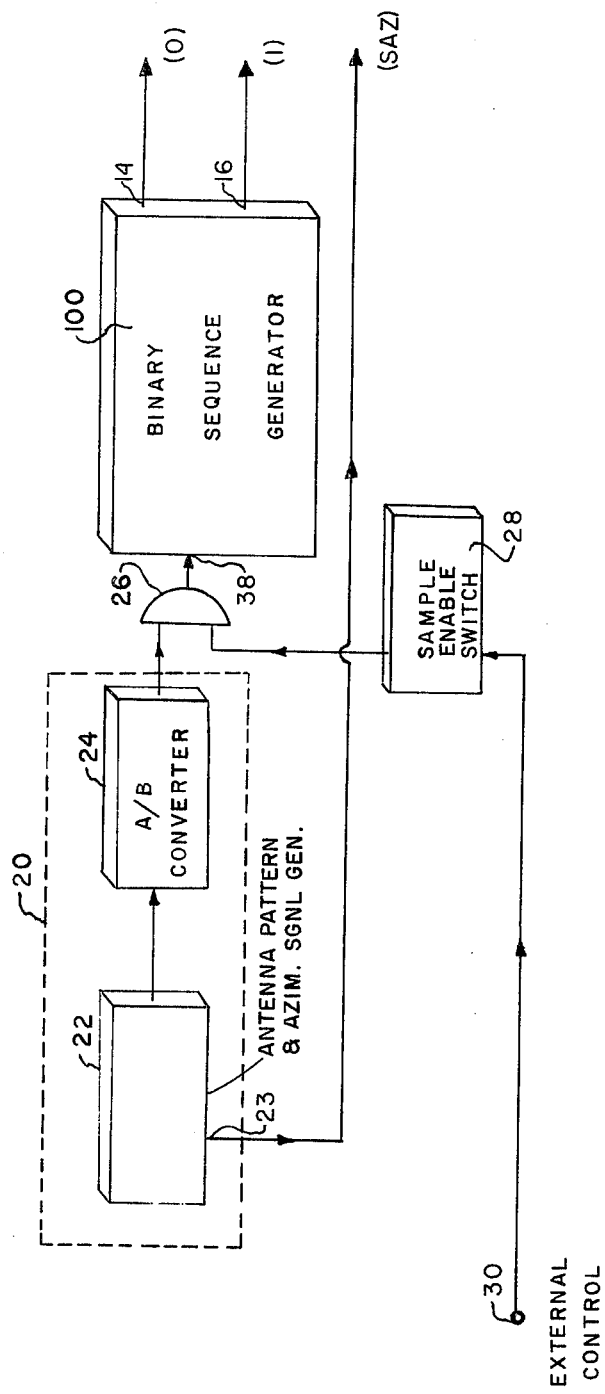

SCAN SIMULATOR FOR SECONDARY RADAR/IFF TESTING

CROSS-REFERENCE TO RELATED PATENT

The present invention is related to copending Application Ser. No. 561,966 of Walton B. Bishop and John M. Hovey, entitled Biased Bit Generator, filed Mar. 25, 1975, and assigned to the assignee of the present invention. This application issued on June 1, 1976 as U.S. Pat. No. 3,961,169.

BACKGROUND OF THE INVENTION

The present invention is related to received signal simulators, and more particularly to simulators for testing the response of IFF decision devices to received transponder replies.

In general, means for testing operational capabilities of secondary radar, IFF target azimuth determiners and IFF Friend-Accept Deciders are both rare and inadequate for their intended purpose. Simulators exist which can accomplish some of the necessary testing but only under limited conditions of operation. Particularly lacking in prior simulation or testing devices is the capability of readily simulating a large number of replies having characteristics which are a function of not only antenna pattern and direction but also of the probability that a "non-fried" can simulate a "friend" return signal.

In overcoming limitations of prior art devices, the technique of the present invention provides test signals for use under laboratory or field conditions for testing of Secondary Radar and IFF equipment.

SUMMARY OF THE INVENTION

The present invention simulates, through a probabilistic technique, "friend" and "non-friend" replies as a function of antenna pattern as would be received by IFF decision device. The antenna pattern is represented by a sequence of binary numbers B. Each of these binary numbers is compared to a randomly generated binary number Y, and binary 1's and 0's then generated according to which of the two numbers B,Y is determined to be the larger.

It is therefore an object of the present invention to simulate replies received by an IFF type decision device.

It is a further object of the present invention to simulate, as a function of antenna pattern and azimuthal variation, replies received by an IFF type decision device:

Other objects, advantages and novel features of the invention will become apparent from the following detailed description of the invention when considered in conjunction with the accompanying drawing wherein:

BRIEF DESCRIPTION OF THE DRAWING

The single FIGURE is a block diagram illustrating an embodiment of the invention.

DETAILED DESCRIPTION

A signal function generator 20 is comprised of an analog antenna pattern generator 22 connected to a Analog-to-Binary (A/B) converter 24 (i.e., an Analog-to-Digital converter where the digital number is in binary form). The output of A/B converter 24 is connected to an input of an AND gate device 26. An output terminal 23 of Antenna Pattern Generator 22 provides a "Simulated Azimuth Signal" (SAZ). A sample generator 28 has an external control terminal 30, and has its output coupled to a second input terminal of AND gate 26.

The output of AND gate 26 is coupled to a number-sequence input terminal 38 of a Binary Sequence Generator 100. This generator 100 is fully described in the above cited copending application to Bishop et al, is incorporated herein by reference and will therefore not be described in detail. In general, a serial digital number, termed B, applied at number-sequence input terminal 38 is compared with an internally generated random binary number Y (having a fixed range between zero and $Y_{max}$). If Y is equal to or larger then B, a "0" bit is generated at the "0" output terminal 14; when Y is less than B a "1" bit is generated at "1" bit output terminal 16.

In operation, a start signal is applied at control terminal 30. This signal acts to close the sample enable switch 28, which then applies an enable voltage to AND gate 26.

Antenna pattern generator 22 provides a time varying analog voltage at its output terminal. This voltage represents the gain of the antenna as it is varied in azimuth (as a function of time t). Also, the time t is itself supplied (as a voltage signal) at output terminal 23 as representative of the simulated azimuth.

The time-varying analog voltage simulating antenna gain variation is sampled and the sample is converted into serial digital form by Analog-to-Binary converter 24. The serial binary signal B (from converter 24) is applied to the other input of AND gate 26. Since AND gate 26 is already enabled (by the enable signal from switch 28), each binary number sample B is applied to number-sequence input terminal 38. As described previously, either a binary "0" or "1" will be generated and appear at either terminal 14 or 16 respectively. The "0" represents a signal received by an IFF type receiver, which signal appears to not be a "correct " signal (i.e., a "non-friend" response); a "1" represents a "correct" (i.e., friend) signal response. The binary number B is generated in a manner such that when the antenna gain is at maximum the binary number B is equal to the maximum value that the binary number Y can take on; is zero where no energy is received in the pattern; and is proportional to the antenna signal strength for values in between. The rationale for establishing the value of B in this manner will be clear upon reading the description of operation in the cited copending application to Bishop et al.

An IFF decision device to be tested is connected so as to utilize the 0's and 1's output signal from terminals 14, 16. The simulated azimuth signal, SAZ, may be utilized by associated test equipment which records the decisional results of the IFF decision device under test as a function of simulated azimuth.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the U.S. is:

1. A system for simulating IFF-type responses received by IFF-type decision devices from a simulated antenna azimuth pattern comprising:

means for generating a binary representation, in the form of a series of binary numbers B, of a time-varying antenna pattern signal whereby said variation in time is related to the azimuthal variation desired to be simulated; and means for generating a corresponding random binary number Y for each said binary number B, for comparing said binary number B with said corresponding binary number Y, for generating a binary "0" when said binary number Y is equal to or larger than said corresponding binary number B, and for generating a binary "1" when said binary number Y is less than said corresponding binary number B.

2. The IFF reply simulation system of claim 1 wherein said means for generating a binary representation includes means for generating a signal indicative of the simulated azimuth of the antenna pattern being simulated.

3. A method for simulating IFF-type replies received by an IFF decision device as a function of antenna pattern variations comprising the steps of:

generating a series of binary numbers B representative of variation in gain as a function of azimuth of an antenna pattern desired to be simulated;

generating a corresponding random binary number Y for each binary number B;

comparing each of said corresponding binary numbers B, Y; and generating a binary "0" when said binary number B is less than said corresponding binary number Y and generating a binary "1" when said binary number B is not less than said corresponding binary number Y.

* * * * *